United States Patent
Ohtani et al.

(10) Patent No.: US 6,238,102 B1
(45) Date of Patent: May 29, 2001

(54) MULTIAXIAL OPTICAL COUPLER

(75) Inventors: Toshihiro Ohtani; Tomoyuki Itoh, both of Sapporo; Yoshinobu Kubota; Takehito Tanaka, both of Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/198,565

(22) Filed: Nov. 23, 1998

(30) Foreign Application Priority Data

Mar. 10, 1998  (JP) .................................................. 10-057758

(51) Int. Cl.$^7$ ....................................................... G02B 6/36
(52) U.S. Cl. ................................ 385/78; 385/66; 385/67; 385/68; 385/73; 385/74; 385/84
(58) Field of Search .................................. 385/66, 67, 68, 385/73, 74, 78, 84, 33

(56) References Cited

U.S. PATENT DOCUMENTS

| | | | | |
|---|---|---|---|---|
| 4,822,129 | * | 4/1989 | Webb | 350/96.18 |
| 5,774,432 | * | 6/1998 | Alon et al. | 369/44.23 |

FOREIGN PATENT DOCUMENTS

| | | |
|---|---|---|
| 63-173007 | 7/1988 | (JP) . |
| 4-301809 | 10/1992 | (JP) . |
| 4-306604 | 10/1992 | (JP) . |
| 5-227116 | 9/1993 | (JP) . |
| 5-232351 | 9/1993 | (JP) . |
| 6-051113 | 2/1994 | (JP) . |
| 7-005339 | 1/1995 | (JP) . |
| 7-033469 | 2/1995 | (JP) . |

\* cited by examiner

Primary Examiner—Frank G. Font
Assistant Examiner—Michael P. Mooney
(74) Attorney, Agent, or Firm—Staas & Halsey, LLP

(57) ABSTRACT

A multiaxial optical coupler for use in a device using an LiNbO3 substrate, which is reliable over a wide temperature range and capable of reducing coupling loss. A capillary has a plurality of linear through holes formed therethrough in a manner each inclined with respect to the central axis of the capillary such that the extension line of the central axis of the linear through hole extends through the center of a lens. A plurality of optical fibers are inserted into the linear through holes, respectively. This construction enables the optical axis of an optical beam emitted from each of the optical fibers within the capillary to pass through the center of the lens and reach the end face of a corresponding one of the optical waveguides. Similarly, the construction enables the optical axis of an optical beam emitted from the end face of each of the optical waveguides on the substrate to pass through the center of the lens and reach a corresponding one of the optical fibers within the capillary. The central axis of each of the linear guide holes is slightly inclined with respect to the optical axis of the lens. However, this inclination angle causes very little optical coupling loss.

6 Claims, 17 Drawing Sheets

MULTIAXIAL OPTICAL COUPLER

BACKGROUND OF THE INVENTION

1. Field of the Invention

The present invention relates to a multiaxial optical coupler, and more particularly to a multiaxial optical coupler for achieving optical coupling between end faces of a plurality of optical waveguides and the same number of optical fibers via a lens.

2. Description of the Related Art

The technique of multiaxial optical coupling is essential to an acoustic optical tunable filter (AOTF), a lithium niobate ($LiNbO_3$; LN) modulator, etc. for use in an add drop multiplexer (ADM) which is a data multiplex transmission device arranged at an intermediate portion of a two-way optical transmission path. Multiaxial optical coupling makes it possible to pass optical signals between a plurality of optical waveguides (generally two optical waveguides) and the same number of optical fibers.

Conventionally, there have been proposed e.g. the following multiaxial optical couplers:

FIG. 11 shows a direct fiber coupler applied to an AOTF. A substrate 110 is formed with an optical path of optical waveguides 111a, 111b, 111c and an optical path of optical waveguides 112a, 112b, 112c. These optical paths meet each other at two intersection points. A combshaped electrode 113 is arranged across the waveguides 111b, 112b, for applying RF frequency voltage from an RF frequency oscillator 114 thereto.

Further, an auxiliary member 115 is provided on an upper surface of a left end portion of the substrate 110, for protecting the end faces of the waveguides 111a, 112a. The waveguide 111a is coupled to an optical fiber 101, while the waveguide 112a is coupled to an optical fiber 102.

Similarly, an auxiliary member 116 is provided on an upper surface of a right end portion of the substrate 110, for protecting the end faces of the waveguides 111c, 112c. The waveguide 111c is coupled to an optical fiber 121, while the waveguide 112c is coupled to an optical fiber 122.

To couple the waveguide 111c and the optical fiber 121 to each other, an end of the optical fiber 121 is pressed against the end face of the waveguide 111c directly, and after final adjustment, the waveguide 111c and the optical fiber 121 are bonded to each other. The waveguides 111a, 112a, and 112c are coupled to the optical fibers 101, 102, and 122, in the same manner.

In the AOTF as described above, two optical beams having respective wavelengths $\lambda 1$ and $\lambda 2$ are inputted e.g. from the optical fiber 101. When RF frequency voltage having a frequency f1 is generated by the RF frequency oscillator 114 and applied to the combshaped electrode 113, a surface acoustic wave (SAW) is generated over the surface of the substrate 110 to change the direction of polarization of only the laser beam having the wavelength $\lambda 1$. As a result, the beam having the wavelength $\lambda 1$ is outputted from the optical fiber 122, and the beam having the wavelength $\lambda 2$ from the optical fiber 121. Thus, it is possible to take out the beam having the wavelength $\lambda 1$ alone. Similarly, it is possible to take out the beam of the wavelength $\lambda 2$ from the optical fiber 122 by applying RF frequency voltage having a frequency f2, which is generated by the RF frequency oscillator 114, to the combshaped electrode 113. The dropping capability of the ADM can be realized by this action.

On the other hand, if an optical beam having a wavelength $\lambda 2$ is inputted to the optical fiber 101 and an optical beam having a wavelength $\lambda 1$ to the optical fiber 102, and then RF frequency voltage having a frequency f1, which is generated by the RF frequency oscillator 114, is applied to the combshaped electrode 113, it is possible to obtain the beams of wavelengths $\lambda 1$ and $\lambda 2$ from the optical fiber 121. The adding capability of the ADM can be realized by this action.

FIG. 12 shows a conventional V-groove coupler. In this coupler, in the surface of an Si substrate 130 formed with optical waveguides 131, 132, V grooves 133, 134 are formed in a manner extending from ends of the optical waveguides 131, 132, respectively, in the same axial directions. Optical fibers 141, 142 are fitted in the V grooves 133, 134, respectively, whereby direct optical coupling is achieved between the optical fibers 141, 142 and the optical waveguides 131, 132, respectively.

FIG. 13 shows a conventional array lens coupler. In this coupler, an array of microlenses 170 is interposed between a substrate 150 formed with optical waveguides 151, 152 and ferrules 161, 162 containing respective optical fibers 161a, 162a, whereby optical couplings are effected between the optical waveguides 151, 152 and the optical fibers 161a, 162a, respectively, via the microlens array 170. After adjusting the positions of the coupled members for optimization, a metal holder for retaining the microlens array 170 is laser welded so as to prevent displacement of the members from the adjusted positions.

FIG. 14 shows a conventional 2-core ferrule coupler. In this coupler, an aspherical lens 200 is interposed between a substrate 180 formed with optical waveguides 181, 182 and a 2-core ferrule 190 containing optical fibers 191, 192, and optical coupling is effected between the optical waveguides 181, 182 and the optical fibers 191, 192, respectively, via the aspherical lens 200. Similarly to the above array lens coupler, after adjusting the positions of the coupled members for optimization, a metal holder for retaining the aspherical lens 200 is laser welded so as to prevent displacement of the members from the adjusted positions. This coupler may employ a spherical lens instead of the aspherical lens 200.

Generally, in an AOTF or the like, $LiNbO_3$ is used as a material for a substrate on which optical waveguides are formed, and hence there is a need for a multiaxial optical coupling method applicable to substrates of this kind of material. Further, it is desired that this kind of device can deliver a predetermined performance over a wide temperature range.

In the direct fiber coupler shown in FIG. 11, the end faces of the waveguides 111, 112 are bonded to the respective optical fibers 121, 122, by an adhesive. However, the glass transition temperature is in the range of approximately 50 to 60° C. Therefore, if the temperature of the junctions of the waveguides 111, 112 and the optical fibers 121, 122 due to changes in fixing intensity of the adhesive or the like exceed a glass transition point, the end faces of the waveguides 111, 112 can be displaced from the bonded end faces of the optical fibers 121, 122. Now, a device necessitating means for optical coupling which will come into use is expected to have an operating temperatur e range of e.g. 0 to 85° C., so that the conventional direct fiber coupler is likely to cause large insertion loss. For this reason, it is impossible to use the above type of direct fiber coupler.

Further, the direct fiber coupler is unreliable in that an increase in load due to temperature cycling or the like can cause degradation of the bonded portions.

Still further, direct optical coupling produces portions different in refractive index, and hence it is impossible to set return loss to a large value (above 30 dB) after modularization.

In the V-groove coupler shown in FIG. 12, the V grooves 133, 134 are formed on the Si substrate 130. The Si substrate 130 allows the grooves 133, 134 to be formed accurately at a low cost. However, it is impossible to form the V grooves on a LiNbO3 substrate accurately at a low cost.

Accordingly, to apply the coupling method using the V grooves to a coupler using a LiNbO3 substrate, it is required, as shown in FIG. 15, to form V grooves on a Si substrate 220, fit optical fibers 221, 222 in the respective grooves, and then join the Si substrate 220 to a LiNbO3 substrate 210 formed with optical waveguides 211, 212. However, it is extremely difficult to position the Si substrate 220 and the LiNbO3 substrate 210 for proper optical coupling between the optical fibers 221, 222 and the optical waveguides 211, 212, and hence this method is not practical.

In the conventional array lens coupler shown in FIG. 13, it is possible to secure the metal holder retaining the array of microlenses 170 by laser welding, thereby enhancing reliability of optical coupling against changes in temperature. However, the arrayed microlenses 170 which are extremely thin are apt to be warped by thermal load or the like. The warpage of the lenses changes optical paths, and increases insertion loss. Further, stress applied to the lenses by the warpage causes marked degradation of polarization quenching ratio.

The conventional 2-core ferrule coupler shown in FIG. 14, which employs the aspherical lens 200 or a spherical lens, does not suffer from the above-mentioned problems as occurs to the array lens coupler, and hence it is reliable over a wide temperature range. In the 2-core ferrule coupler, however, optical beams transmitted via the optical fibers 191, 192 or the optical waveguides 181, 182, respectively, cannot pass through the center of the aspherical lens 200 or the spherical lens, which results in an increase in coupling loss. This problem comes from the construction of the 2-core ferrule coupler as described below with reference to FIGS. 16 and 17.

FIG. 16 shows the substrate 180, the 2-core ferrule 190, and the aspherical lens 200, as viewed from the top of the coupler. The distance between the central axes of the optical fibers 191, 192 contained in the 2-core ferrule 190 is 125 $\mu$m at the minimum. The lens 200 is positioned such that the central axis thereof is opposed to the mid point between the two central axes of the optical fibers 191, 192, so as to equalize coupling losses of the respective optical fibers 191, 192. Therefore, the distance (translational displacement) between the central axis of the aspherical lens 200 and that of each of the optical fibers 191 and 192 is more than 60 $\mu$m.

FIG. 17 is a graph showing the relationship between coupling loss and translational displacement of the central axis of the optical fiber from that of the lens. As shown in the graph, when the translational displacement reaches 60 $\mu$m, the coupling loss is increased by about 0.6 dB. Therefore, the 2-core ferrule coupler is inconvenience in that it is required to minimize the coupling loss per se, and that it is necessary to adjust the minute distance in adjustment of the optical axes, which makes operations for adjustment very difficult.

SUMMARY OF THE INVENTION

It is an object of the invention to, provide a multiaxial optical coupler for use in a device using an LiNbO3 substrate, which is reliable over a wide temperature range and capable of reducing coupling loss.

To attain the above object, the present invention provides a multiaxial optical coupler for achieving optical coupling between the end faces of a plurality of optical waveguides and optical fibers of the same number as that of the optical waveguides via a lens. This multiaxial optical coupler is characterized by comprising a capillary provided within an end portion of a ferrule, a plurality of linear through holes each extending through the capillary such that an extension line of a central axis thereof passes through a center of the lens, and a plurality of optical fibers inserted into the linear through holes respectively.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to accompanying drawings.

Figure 1:
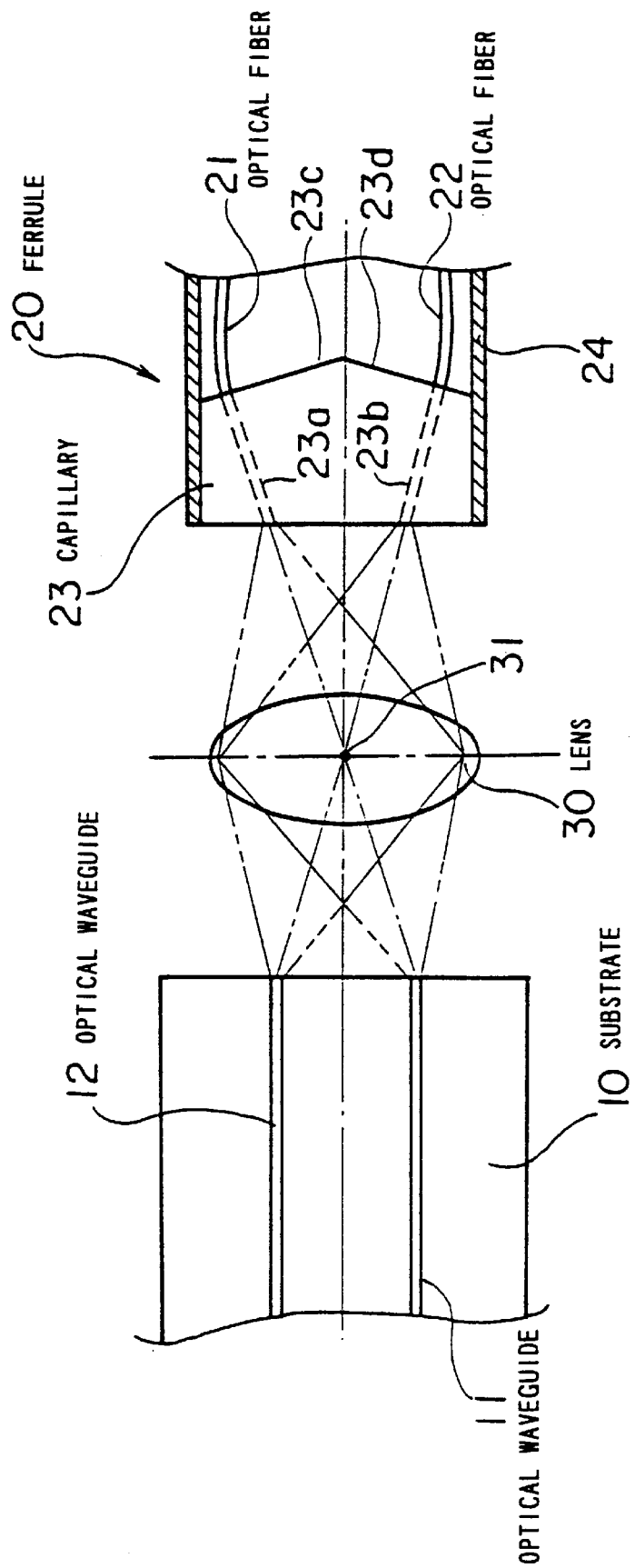
FIG. 1 is a plan view showing conceptual representation of construction of a multiaxial optical coupler according to a first embodiment of the present invention.

Referring first to FIG. 1, description is made of the principles and construction of a multiaxial optical coupler according to a first embodiment of the invention. The multiaxial optical coupler achieves optical coupling between end faces of a plurality of optical waveguides 11, 12 and the same number of optical fibers 21, 22 via a lens 30. As shown in FIG. 1, the multiaxial optical coupler includes a substrate 10 formed with the optical waveguides 11, 12, a ferrule 20 having the optical fibers 21, 22 therein, and the lens 30 interposed between the substrate 10 and the ferrule 20.

More specifically, the multiaxial optical coupler of the present invention includes a capillary 23 provided at an inner end portion of the ferrule 20, a plurality of linear through holes 23a, 23b each of which extends through the capillary 23 in such a manner that the extension line of its central axis passes through the center 31 of the lens 30, and the optical fibers 21, 22 having end portions thereof inserted into the linear through holes 23a, 23b, respectively.

In the above construction, the linear through holes 23a, 23b are each formed through the capillary 23 in a manner inclined with respect to the central axis of the ferrule 20, and at the same time the distance between the lens 30 and the capillary 23 is determined, such that the central axis of each of the linear through holes 23a, 23b extends through the center 31 of the lens 30. The optical fibers 21, 22 are inserted into the linear through holes 23a, 23b formed as above.

As a result, the optical axis of a light beam emitted from the optical fiber 21 in the capillary 23 passes through the center 31 of the lens 30 and reaches the end face of the optical waveguide 11 formed on the substrate 10. Similarly, the optical axis of a light beam emitted from the optical fiber 22 in the capillary 23 passes through the center 31 of the lens 30 and reaches the end face of the optical waveguide 12 also formed on the substrate 10.

In this case, if the distance between a plane perpendicular to the optical axis of the lens 30 at the center 31 of the lens 30 and a lens-side end face of the capillary 23 is set to 3 mm and the distance between the central axes of the optical fibers 21, 22 on the lens-side end face of the capillary 23 is set to 125 μm, the central axes of the linear through holes 23a, 23b are each inclined at approximately 1.3 degrees with respect to the optical axis of the lens 30.

Figure 2:
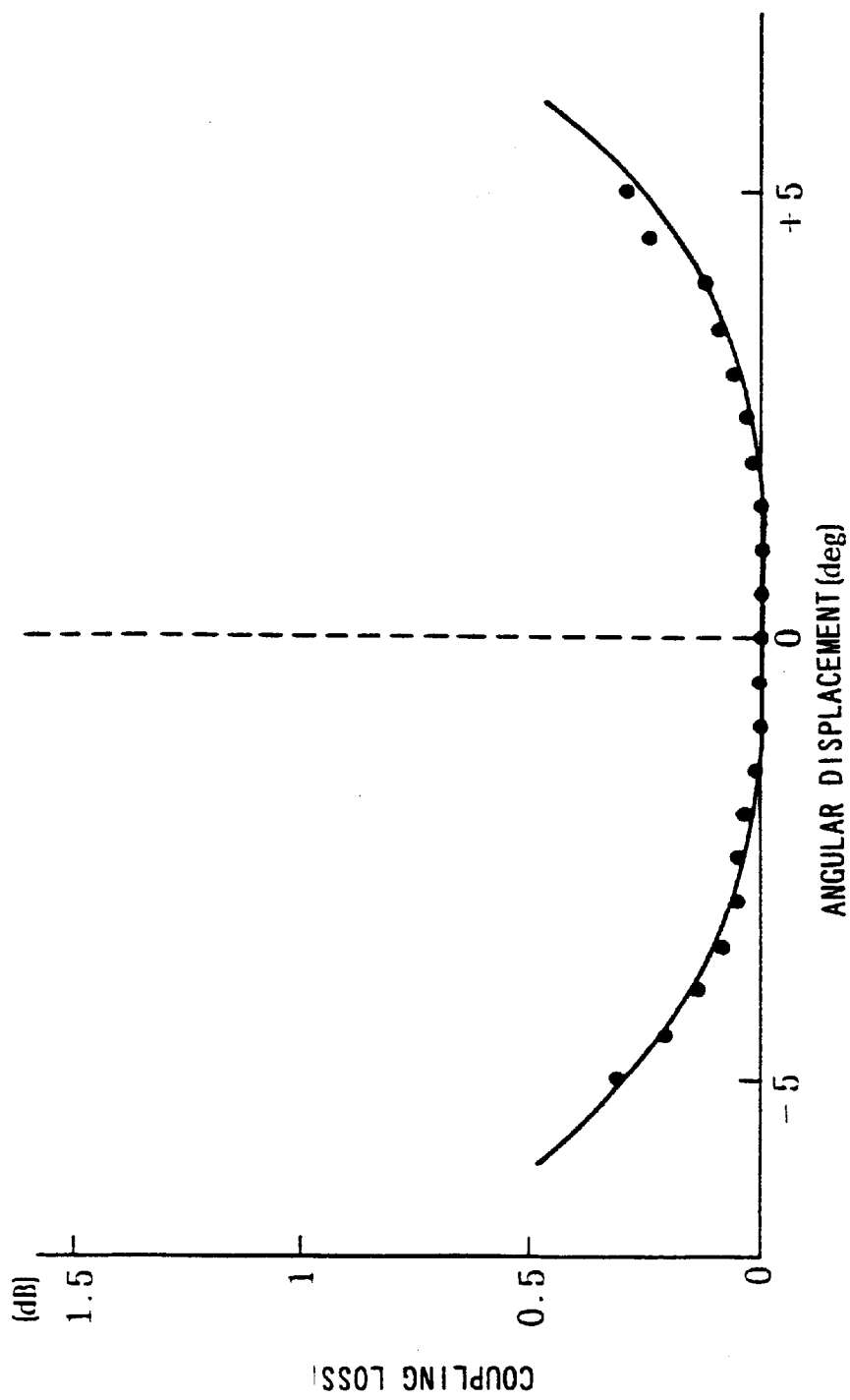
FIG. 2 is a graph showing the relationship between a coupling loss and an angular displacement of an optical beam incident on a lens with respect to an optical axis of the lens, the displacement occurring in an optical coupling achieved under a condition in which the optical axis of the lens and a central axis of an optical fiber agree with each other.

FIG. 2 is a graph showing the relationship between coupling loss and angular displacement of an optical beam incident on a lens with respect to the optical axis of the lens in an optical coupling achieved under a condition in which the optical axis of the lens and the central axis of an optical fiber agree with each other. As shown in the graph, optical coupling loss is approximately equal to zero when the angular displacement is 1.3 degrees.

Therefore, the application of an optical coupler constructed as above to a device using a LiNbO3 substrate will enable multiaxial optical coupling to be achieved reliably over a wide temperature range with only a little coupling loss.

Next, the first embodiment will be described in further detail.

In the first embodiment, the substrate 10 formed of LiNbO3 has an acoustic optical tunable filter (AOTF) or a directional coupling Mach-Zehnder external interference modulator formed therein. When high frequency voltage is applied to the substrate 10 of LiNbO3, surface acoustic wave distortion occurs to change the refractive index of a medium. The AOTF is a device for carrying out separation of a double optical signal comprised of two optical signals different in wavelength or multiplexing of single optical signals different in wavelength by utilizing the above property of the LiNbO3 substrate 10. The lens 30 is an aspherical or spherical lens retained by a metal holder.

Figure 3:
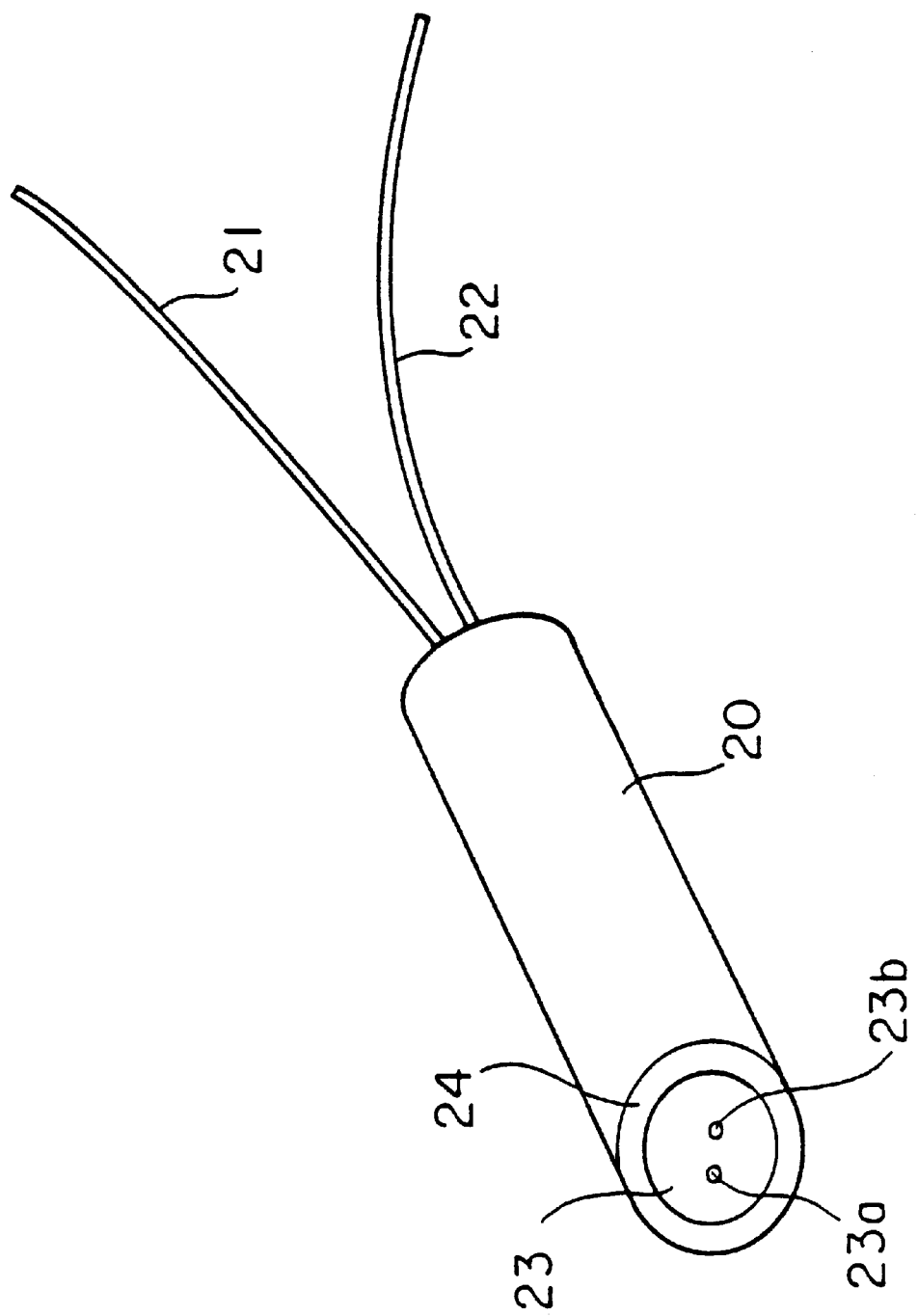
FIG. 3 is a perspective view showing an appearance of a ferrule of the multiaxial optical coupler according to the first embodiment.

FIG. 3 shows the appearance of the ferrule 20 appearing in FIG. 1. The ferrule 20 has a surface thereof covered with a metal portion 24. The metal portion 24 is formed e.g. of SUS. The ferrule 20 has a cylindrical shape e.g. with a diameter of 2.5 mm and a length of 10 mm. The optical fibers 21, 22 extend out from the ferrule 20 in a flexible manner.

Figure 4:
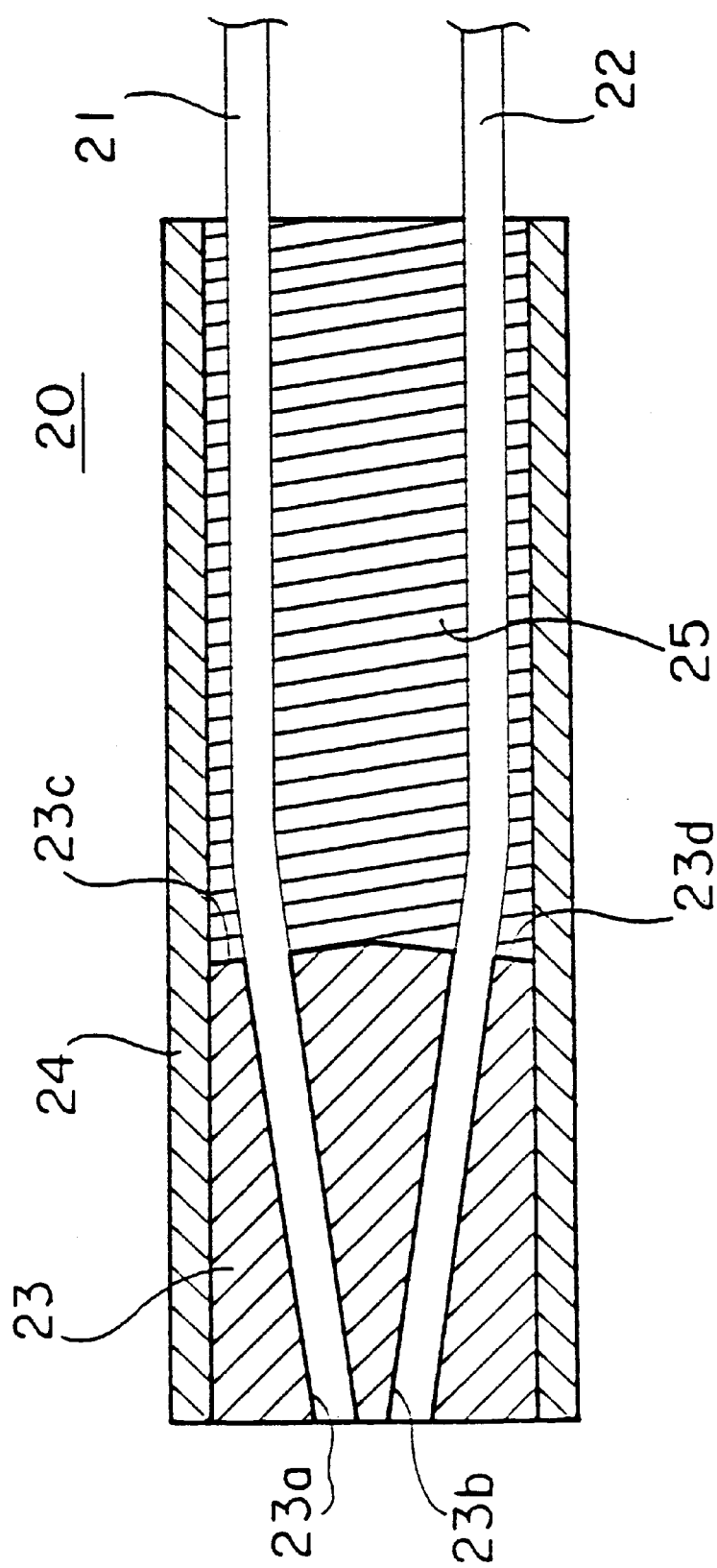
FIG. 4 is a longitudinal sectional view showing an internal construction of the ferrule.

FIG. 4 shows the internal construction of the ferrule 20 in longitudinal section. The portion of each of the optical fibers 21, 22 extending out of the linear through hole 23a (23b) of the capillary 23 is originally flexible, so that the flexible portions of the optical fibers 21, 22 are guided outward of the metal portion 24, and then the metal portion 24 is filled with an adhesive so as to form a filled portion 25 for fixing the optical fibers 21, 22 within the ferrule 20.

Figure 5A:
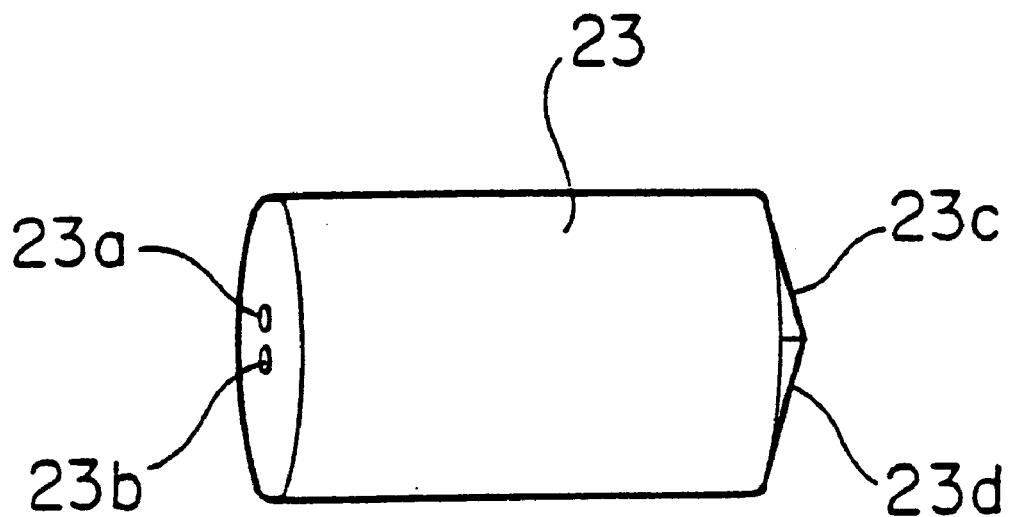
FIG. 5(A) is a perspective view showing an appearance of a capillary.
Figure 5B:
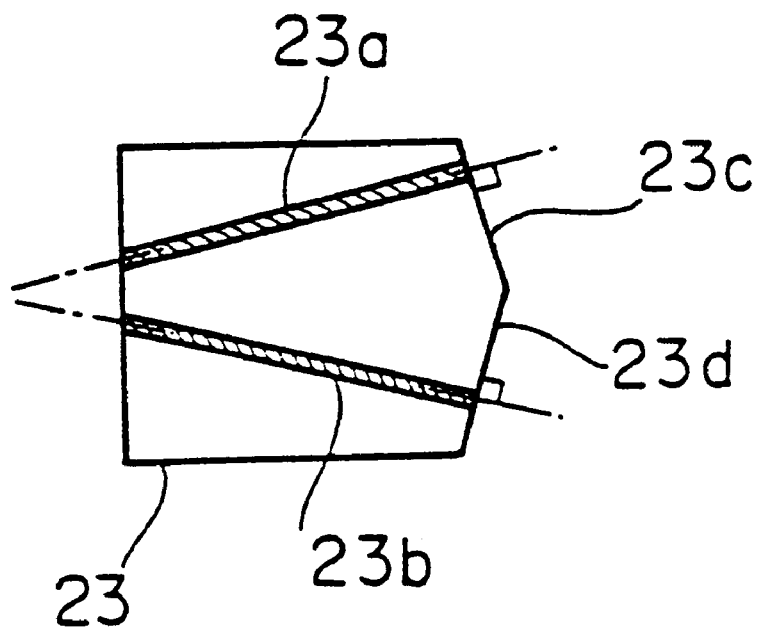
FIG. 5(B) is a longitudinal sectional view of the capillary.

FIGS. 5(A) and 5(B) show the construction of the capillary 23. FIG. 5(A) shows the appearance of the capillary 23 in perspective, while FIG. 5(B) shows the same in longitudinal section. The capillary 23 is formed of zirconia and has a generally cylindrical shape. In producing the capillary 23, an end or bottom of the cylinder is machined to form end faces 23c, 23d inclined at a predetermined angle (e.g. approximately 1.3 degrees) in positive and negative directions, respectively, with respect to the surface of the original end or bottom of the cylinder. Then, the linear through holes 23a, 23b perpendicular respectively to the end faces 23c, 23d are formed through the capillary 23. The locations of the ends of the linear through holes 23a, 23b on the end faces 23c, 23d are set such that the distance between the central axes of the linear through holes 23a, 23b on the other end of the cylinder is held e.g. at 125 μm.

The optical fibers 21, 22 are inserted into the linear through holes 23a, 23b, respectively, whereby the capillary 23 is completely assembled. Then, the ferrule 20 is assembled. The ferrule 20 and the lens 30 are arranged such that the distance between the lens-side end face of the ferrule 20 and the center 31 of the lens 30 is e.g. 3 mm, and the extension lines of the central axes of the respective linear through holes 23a, 23b extend through the center 31 of the lens 30.

Thus, reliable optical coupling can be achieved over a wide temperature range in multiaxial optical coupling of a device using a substrate of LiNbO3 by interposing an aspherical or spherical lens between the substrate and the ferrule 20. Further, the multiaxial optical coupler of the present embodiment makes it possible to reduce coupling loss which is conventionally high in multiaxial coupling achieved via an aspherical or spherical lens.

Further, the process required for causing optical beams from the respective optical fibers 21, 22 in the capillary 23 to pass through the center 31 of the lens 30 is only to machine the capillary 23 such that the end faces 23c, 23b inclined at a predetermined angle are formed and the linear through holes 23a, 23b are formed through the capillary 23 in a direction perpendicular to the end faces 23c, 23d, respectively. Therefore, the machining or processing newly required for implementation of the present invention has little effect on manufacturing costs.

Although in the first embodiment, the substrate 10 is formed with the AOTF, this is not limitative, but the substrate 10 may be formed with a directional coupling external interference modulator (e.g. Mach-Zehnder modulator).

Also when the interference modulator is formed, LiNbO3 is used as a material for the substrate. However, LiNbO3 is highly pyroelectric, so that polarization charge appears on the substrate due to a change in temperature. This polarization charge works as bias in the external interference modulator. Accordingly, it is required to eliminate the bias from the external interference modulator. It is conventionally known that there is correlation between the intensity of an optical beam in radiation mode and the magnitude of bias in an external interference modulator. Therefore, the intensity of each optical beam in radiation mode can be monitored by one of various methods. When employing the external interference modulator, modulation voltage of the modulator is adjusted according to the monitored beam intensity to thereby eliminate the bias.

An optical beam in radiation mode has a property of appearing just near the end of each optical waveguide on a lens-side face of the substrate from which a proper optical signal is delivered. Therefore, according to the present invention, optical coupling is effected between the ferrule 20 and the lens-side face of the substrate via the lens 10 while taking the property of the optical beam in radiation mode into account, whereby the multiaxial optical coupler according to the invention takes both proper optical signals and beams in radiation mode into the two optical fibers 21, 22 within the ferrule 20. This facilitates the monitoring of the optical beams in radiation mode.

Although in the present embodiment, the capillary 23 is formed with the two end faces 23c, 23d at one end thereof, this is not limitative, but the cylindrical capillary 23 may have three end faces: two end faces formed by cutting away two portions of one end or bottom of the cylinder and a third end face formed by the remaining end face portion of the original end or bottom. In this case, the inclination angle of the two end faces formed by cutting away the end or bottom of the capillary 23 is identical with that of the end faces 23c, 23d, and linear through holes are formed through the capillary 23 in a direction perpendicular to the two end faces, respectively, similarly to the linear through holes 23a, 23b.

Next, description will be made of a second embodiment of the present invention.

Figure 6:
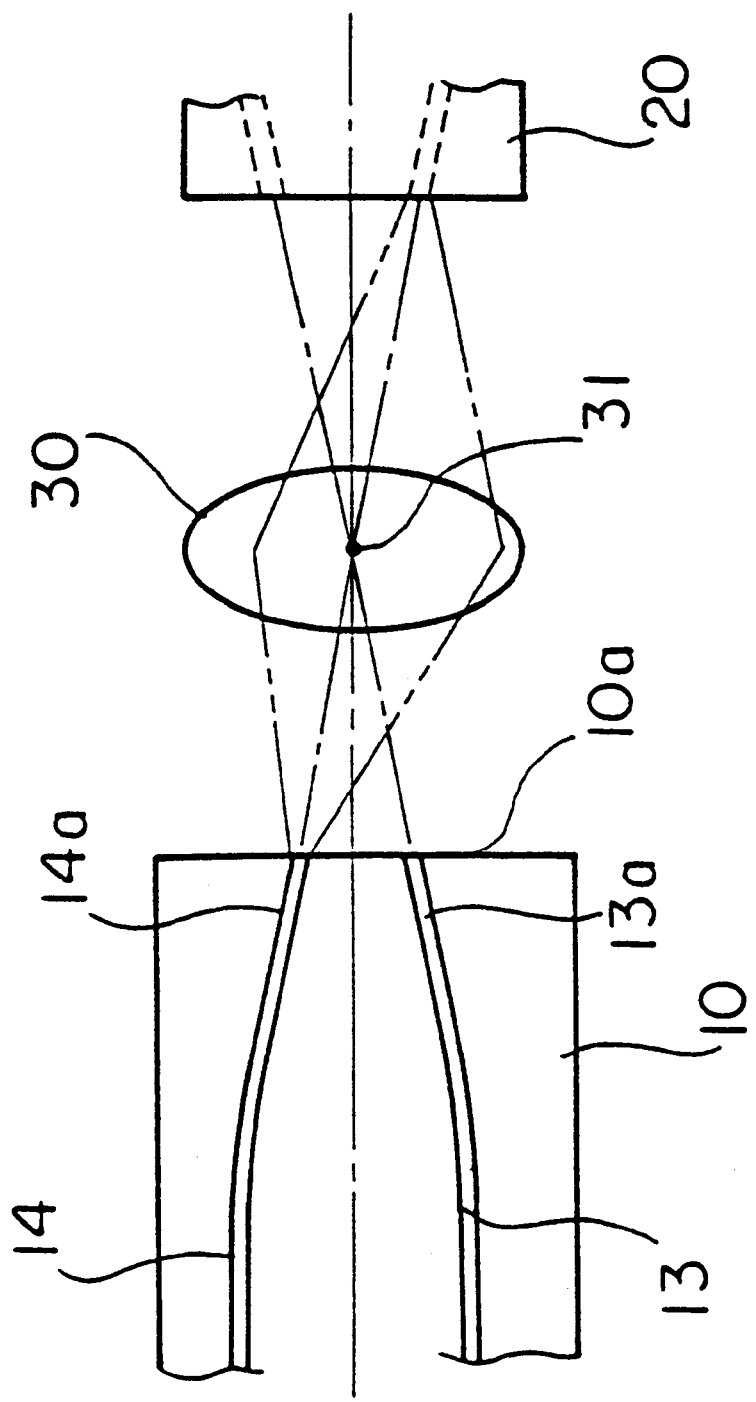
FIG. 6 is a plan view showing conceptual representation of construction of a multiaxial optical coupler according to a second embodiment of the present invention.

FIG. 6 shows the arrangement of an optical coupler and the construction of a substrate of the device, according to the second embodiment. The construction of the second embodiment is basically identical with that of the first embodiment. Therefore, components corresponding to those of the first embodiment are indicated by identical reference numerals, and detailed description thereof will be omitted.

In the second embodiment, optical waveguides 13, 14 formed through the substrate 10 are different in shape from those in the first embodiment. More specifically, the optical waveguides 13, 14 of the present embodiment have lens-side end portions formed as oblique waveguide portions 13a, 14a, respectively. The oblique waveguide portions 13a, 14a each have a linear shape, and each axis thereof is set to be inclined such that the extension line thereof passes through the center 31 of the lens 30.

According to this construction, it is possible to further improve optical coupling efficiency compared with the first embodiment. Further, the construction makes it possible to enhance optical coupling efficiency even when optical beams are emitted from the optical waveguides 13, 14.

Although the optical waveguide 13(14) formed with the oblique waveguide portion 13a(14a) has to be bent at a point from which the oblique waveguide portion 13a(14a) extends, the bending angle is so small (approximately 1.3 degrees) that occurrence of bending loss in the optical waveguides 13, 14 can be prevented.

Figure 7A:
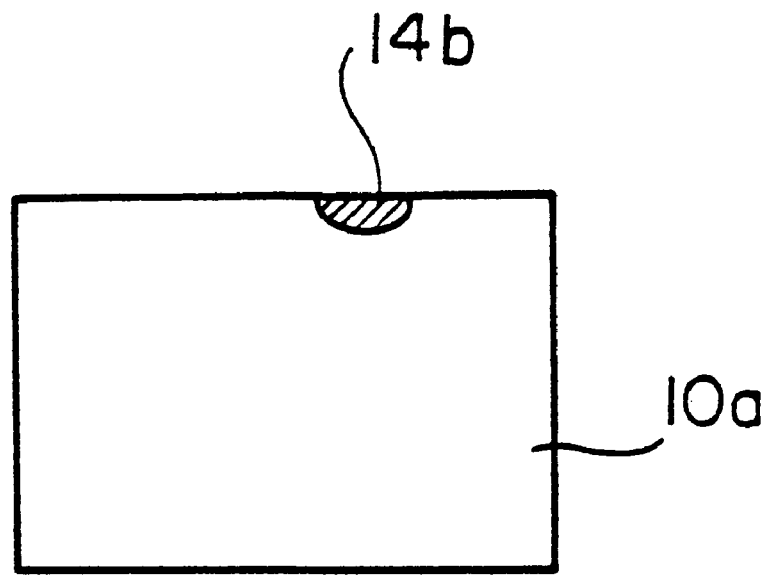
FIG. 7(A) is an end view of a substrate showing a cross section of an end face of an oblique waveguide portion.
Figure 7B:
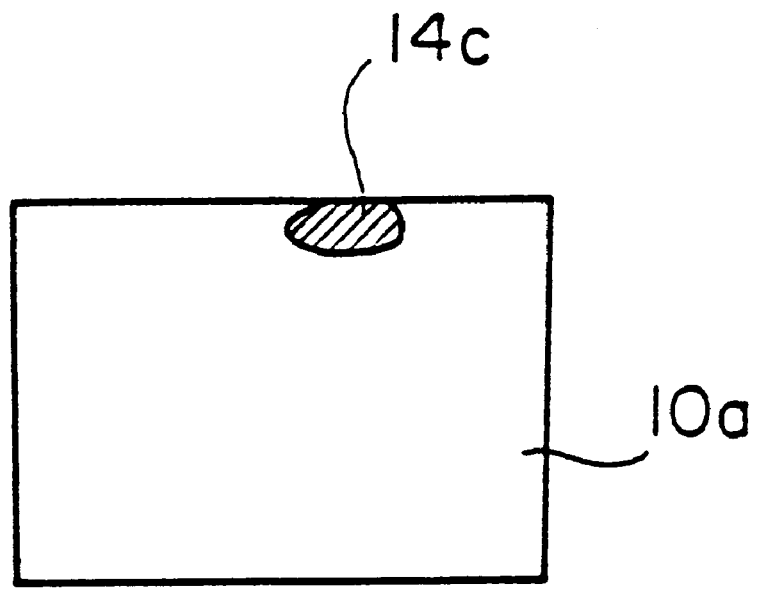
FIG. 7(B) is an end view of the substrate showing a profile formed by an incident beam on the substrate.

The oblique waveguide portion 14a is formed to have a substantially semicircular end face (cross section) 14b on the lens-side end face 10a of the substrate 10, as shown in FIG. 7(A), by diffusing Ti by a conventional thermal diffusion method. FIGS. 7(A) and 7(B) are views showing the lens-side end face 10a of the substrate 10, in which FIG. 7(A) shows the end face 14b of the oblique waveguide portion 14a on the face 10a. In normal processing by the thermal diffusion method, Ti is evaporated and deposited onto the LiNbO3 substrate 10 to have a predetermined shape and uniform thickness, and then the deposited Ti is thermally diffused over the substrate 10.

On the other hand, an optical beam incident on the face 10a of the substrate 10 from the ferrule 20 via the lens 30 forms an oval profile 14c on the face 10a as shown in FIG. 7(B) because the beam does not impinge on the face 10a at right angles.

In this case, it is possible to improve optical coupling efficiency by shaping the end face 14b of the oblique waveguide portion 14a to the profile 14c of the incoming beam. Therefore, in the second embodiment, the processing by the thermal diffusion method is carried out as below.

Figure 8A:
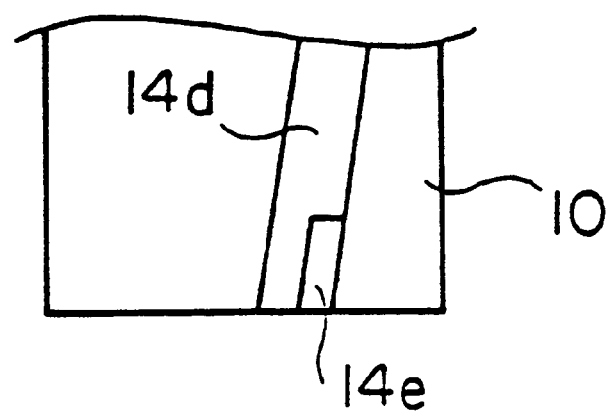
FIG. 8(A) is a top view of the substrate having a Ti film formed thereon by vapor deposition.
Figure 8B:
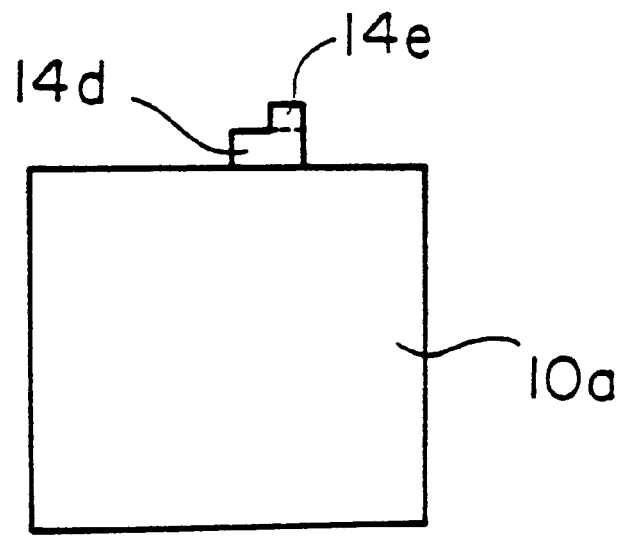
FIG. 8(B) is an end view of the substrate having the Ti film formed thereon by vapor deposition.

FIG. 8(A) shows the substrate 10 having a deposited Ti film formed thereon, while FIG. 8(B) shows the substrate 10 as viewed from the end face 10a side. First, Ti is evaporated onto a portion of the substrate 10 at which the optical waveguide 14 including the oblique waveguide portion 14a is to be formed, so as to form a Ti film 14d. Then, a second evaporation or vapor deposition of Ti is carried out to form a Ti film 14e. The Ti film 14e is formed on the deposited film 14d at a location extending from the end face 10a and corresponding to an expanded portion of the profile 14c to be formed by the incoming beam. Thus, the resulting Ti film is not uniform in thickness, but has a stepped shape as shown in FIG. 8(B) in which the resulting Ti film is viewed from the end face 10a side.

Figure 8C:
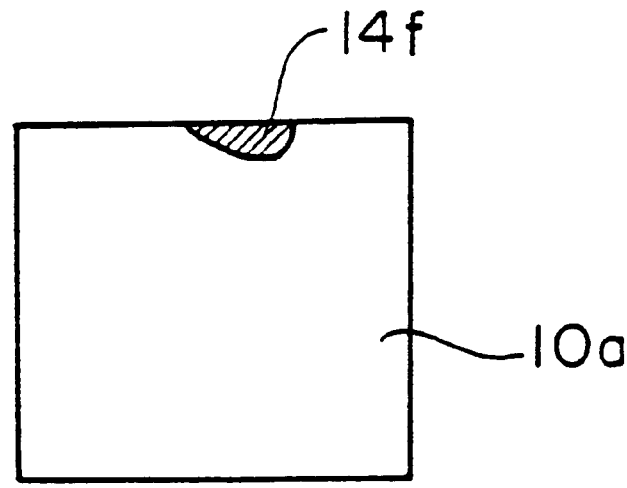
FIG. 8(C) is an end view of the substrate having an oblique waveguide portion formed thereon by thermal diffusion of the Ti film.

When the Ti film and the substrate 10 are heated, Ti is diffused over the substrate 10 to form the optical waveguide 14 including the oblique waveguide portion 14a, which has an end face 14f shown in FIG. 8(C). The end face 14f has a shape obtained by dividing an oval figure (egg-like shape) in two along a longitudinal axis thereof. FIG. 8(C) shows the substrate 10 as viewed from the side of the face 10a after thermal diffusion of the Ti film.

Although the above description is made of the oblique waveguide portion 14a alone, the other oblique waveguide portion 14b is formed in the same manner.

Thus, the waveguides each having an end face similar in shape to the profile of an incoming beam can be formed. This makes it possible to prevent degradation of optical coupling efficiency even if an incoming beam does not impinge upon the face 10a of the substrate 10 at right angles.

Next, description will be made of a third embodiment of the present invention.

The construction of the third embodiment is basically identical with that of the first embodiment. Therefore, components corresponding to those of the first embodiment are indicated by identical reference numerals, and detailed description thereof will be omitted.

Figure 9B:
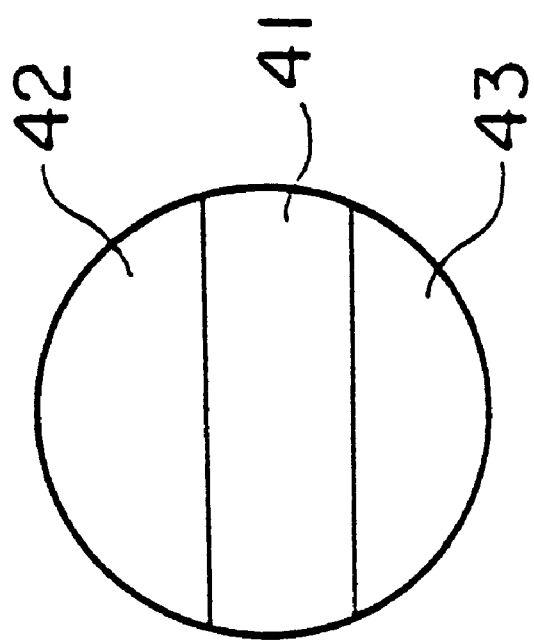
FIG. 9(B) is an end view of the capillary.
Figure 9A:
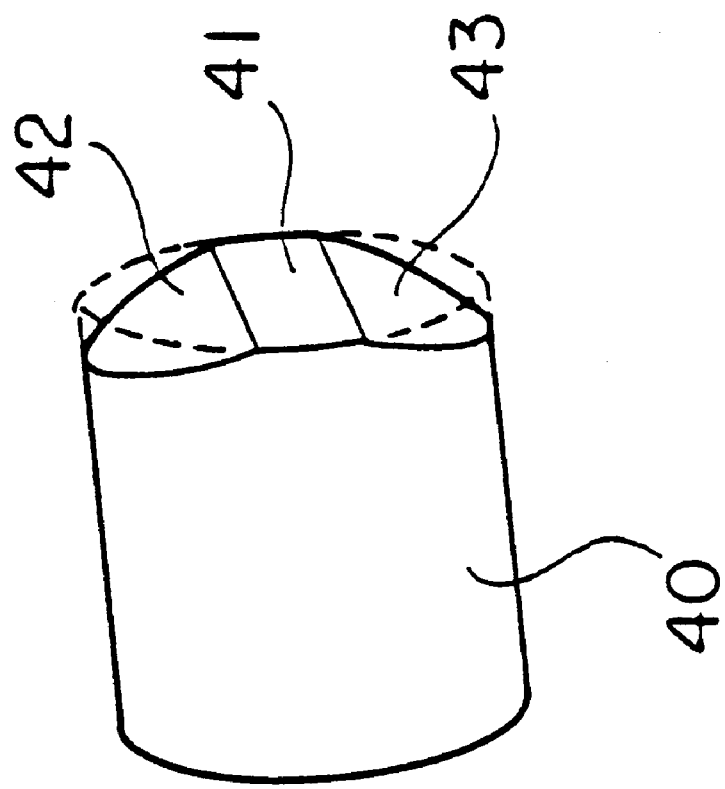
FIG. 9(A) is a perspective view showing an appearance of a capillary before machining of linear through holes, of a ferrule of a multiaxial optical coupler according to a third embodiment.
Figure 10:
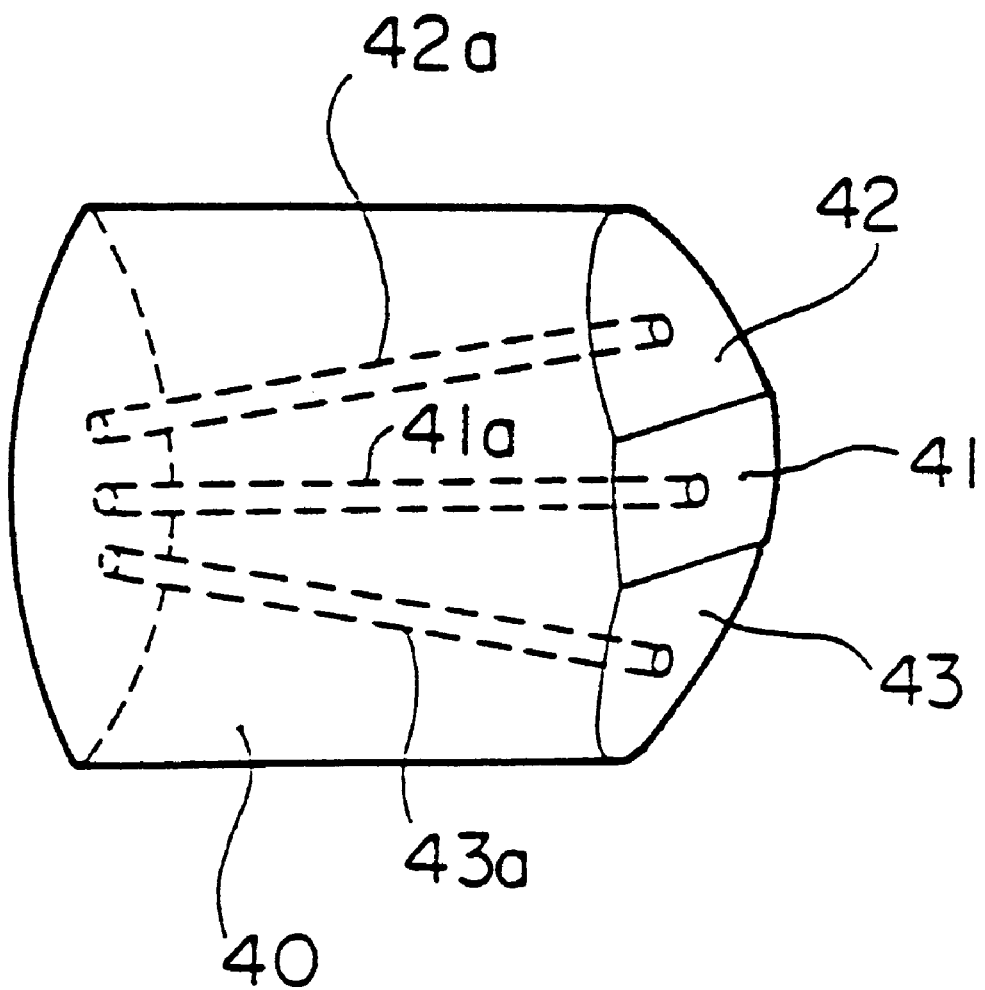
FIG. 10 is a perspective view showing an appearance of the capillary after machining of the linear through holes.
Figure 11:
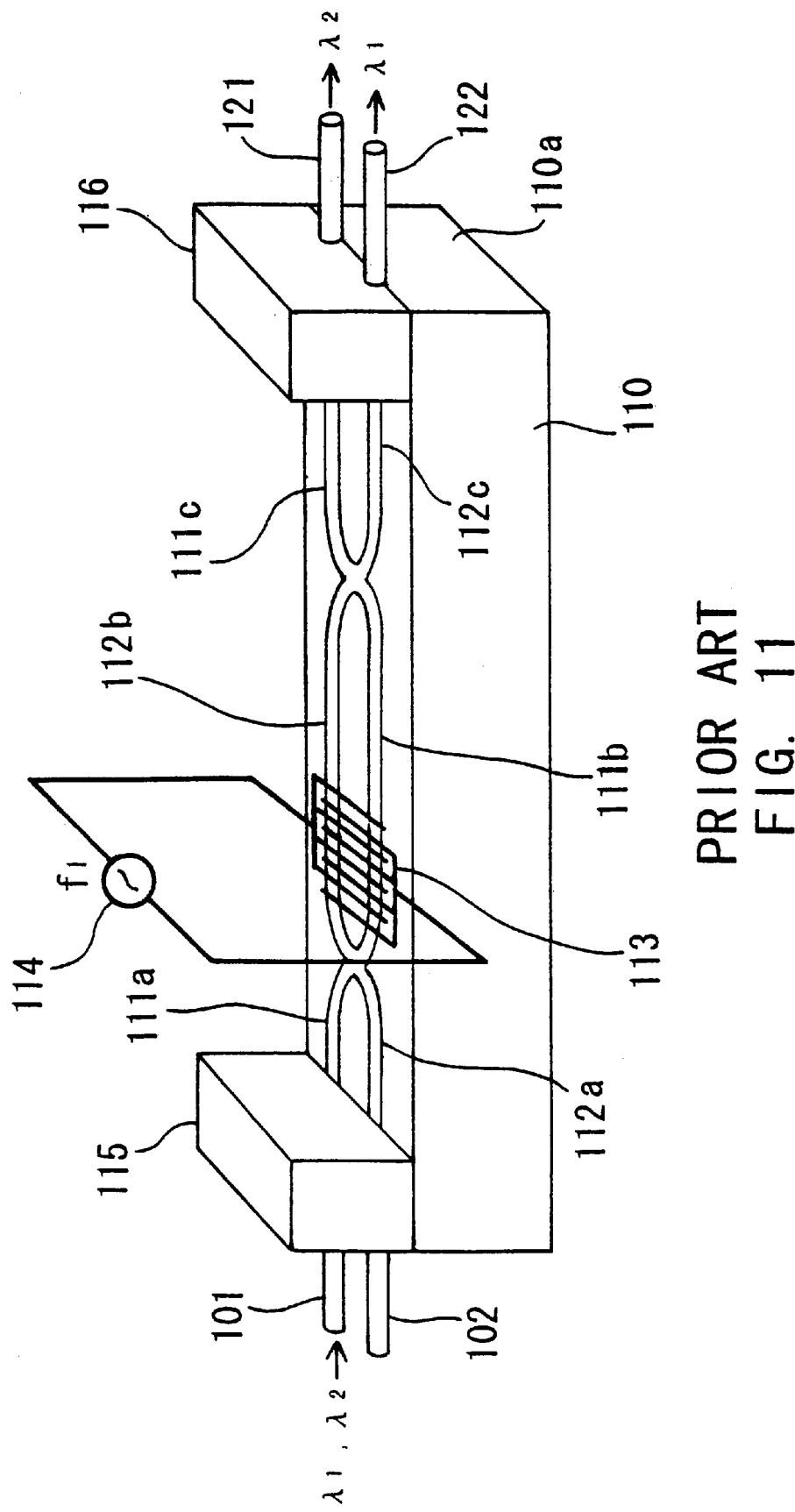
FIG. 11 is a perspective view showing a conventional direct fiber coupler applied to an AOTF.
Figure 12:
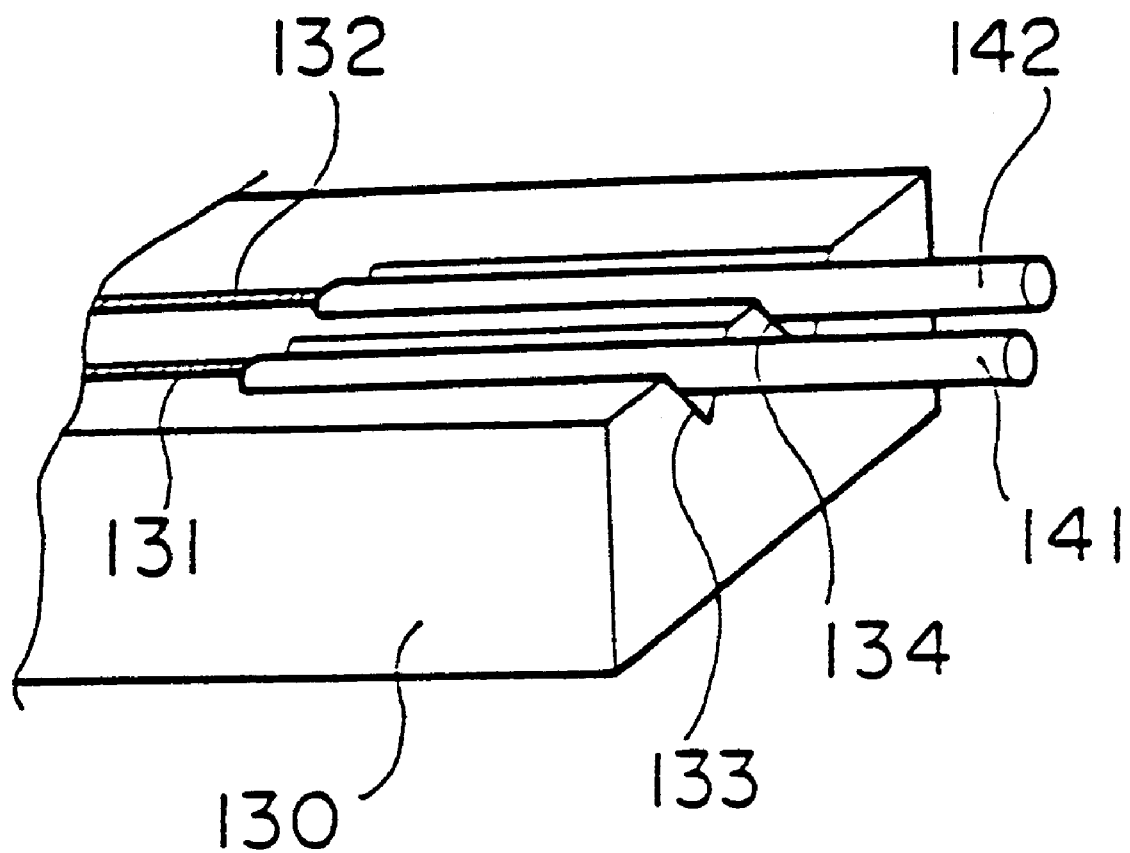
FIG. 12 is a perspective view showing a conventional V-groove coupler.
Figure 13:
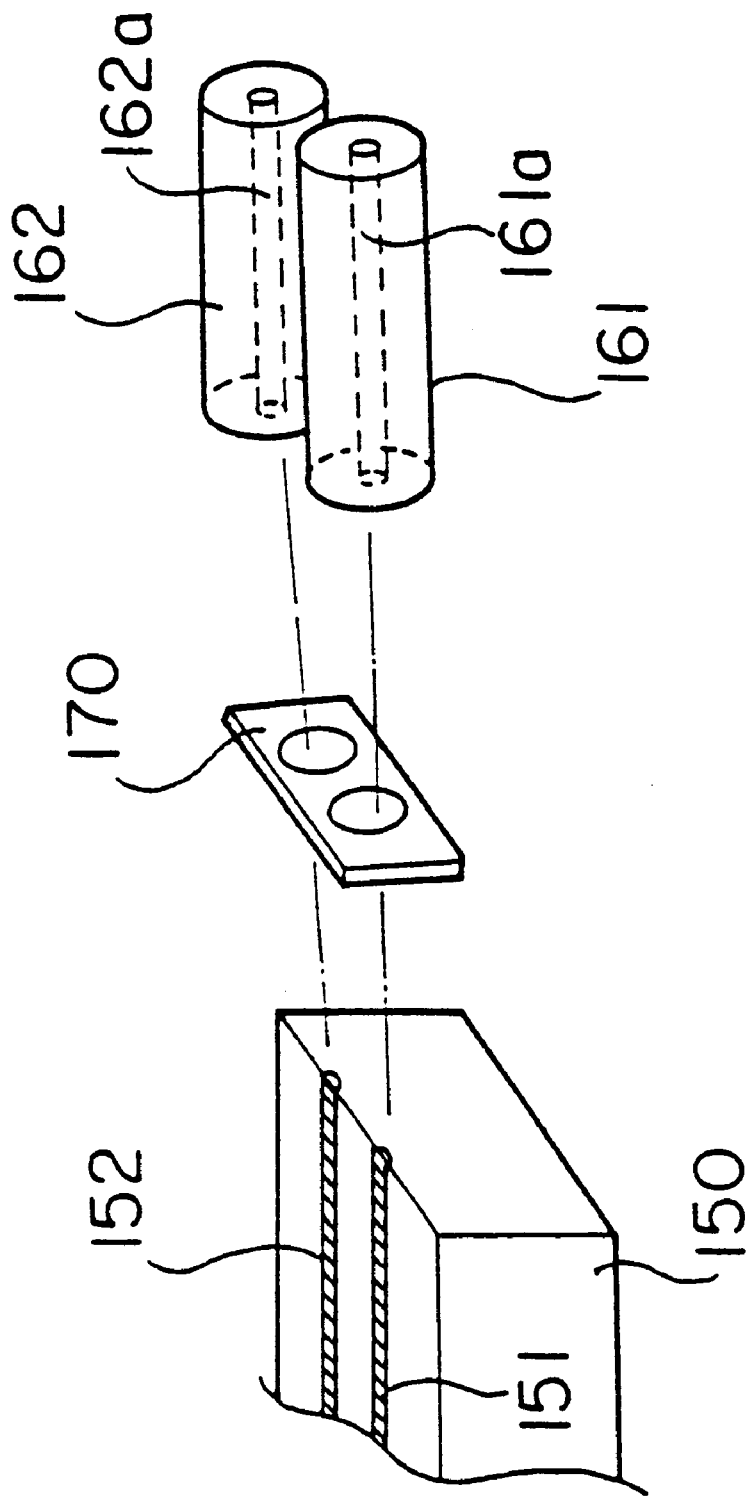
FIG. 13 is a perspective view showing a conventional array lens coupler.
Figure 14:
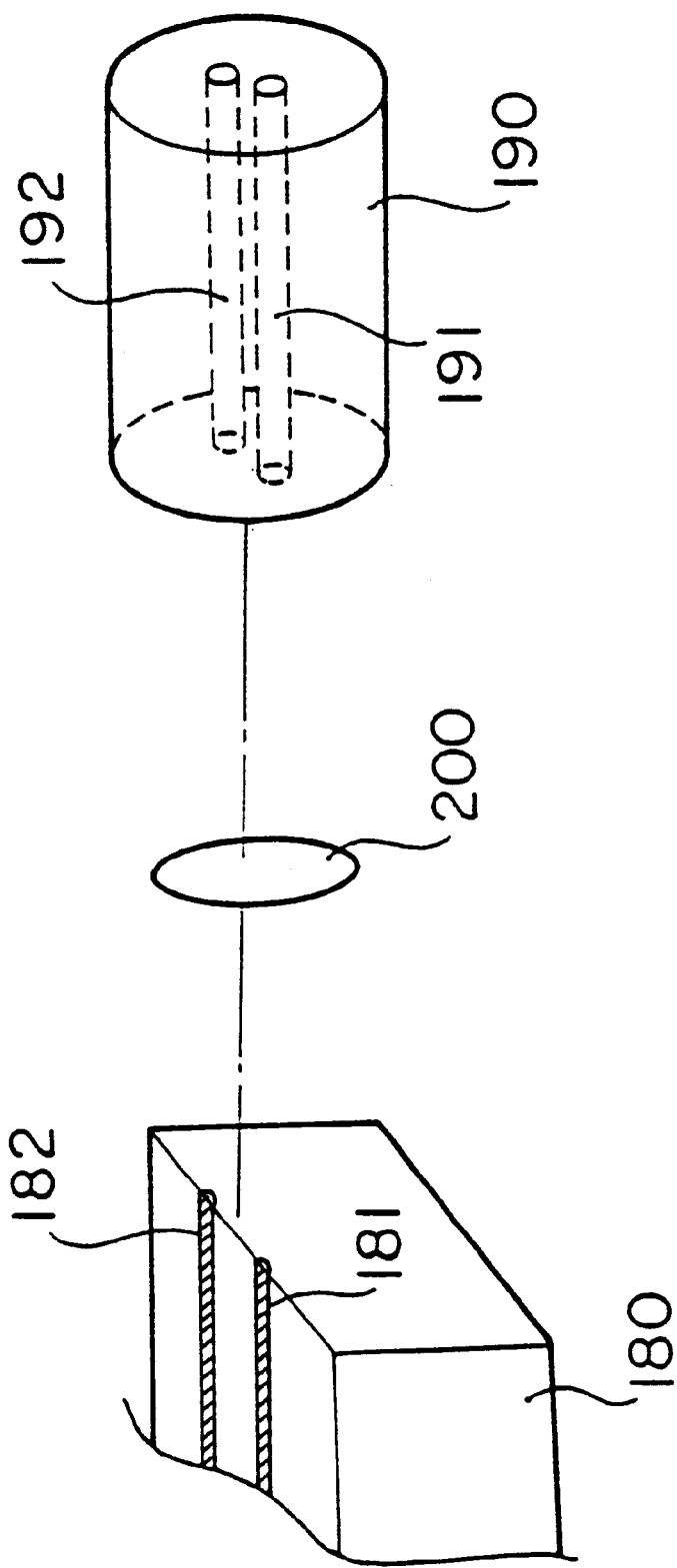
FIG. 14 is a perspective view showing a conventional 2-core ferrule coupler.
Figure 15:
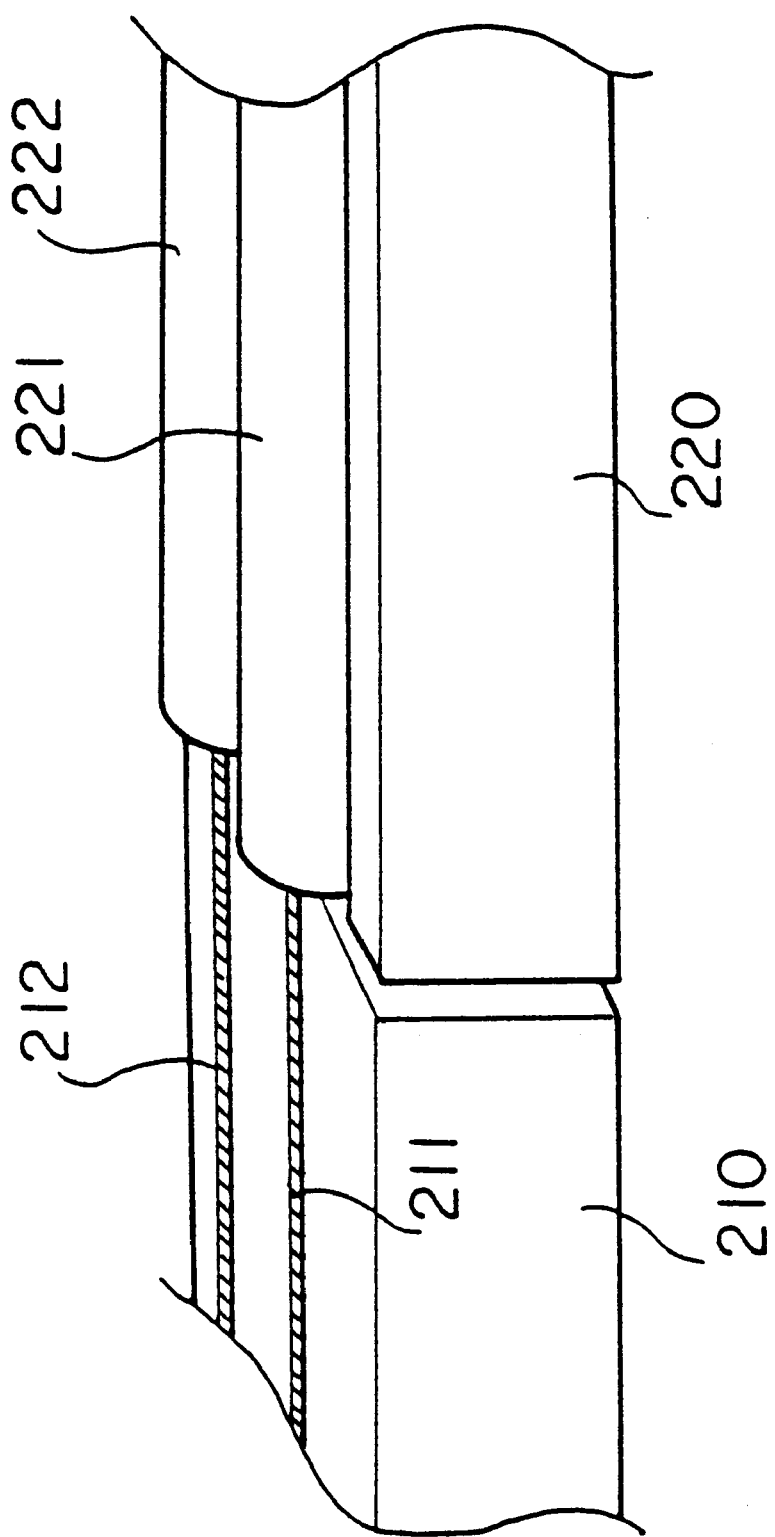
FIG. 15 is a perspective view showing the V-groove coupler combined with a LiNbO3 substrate formed with optical waveguides.
Figure 16:
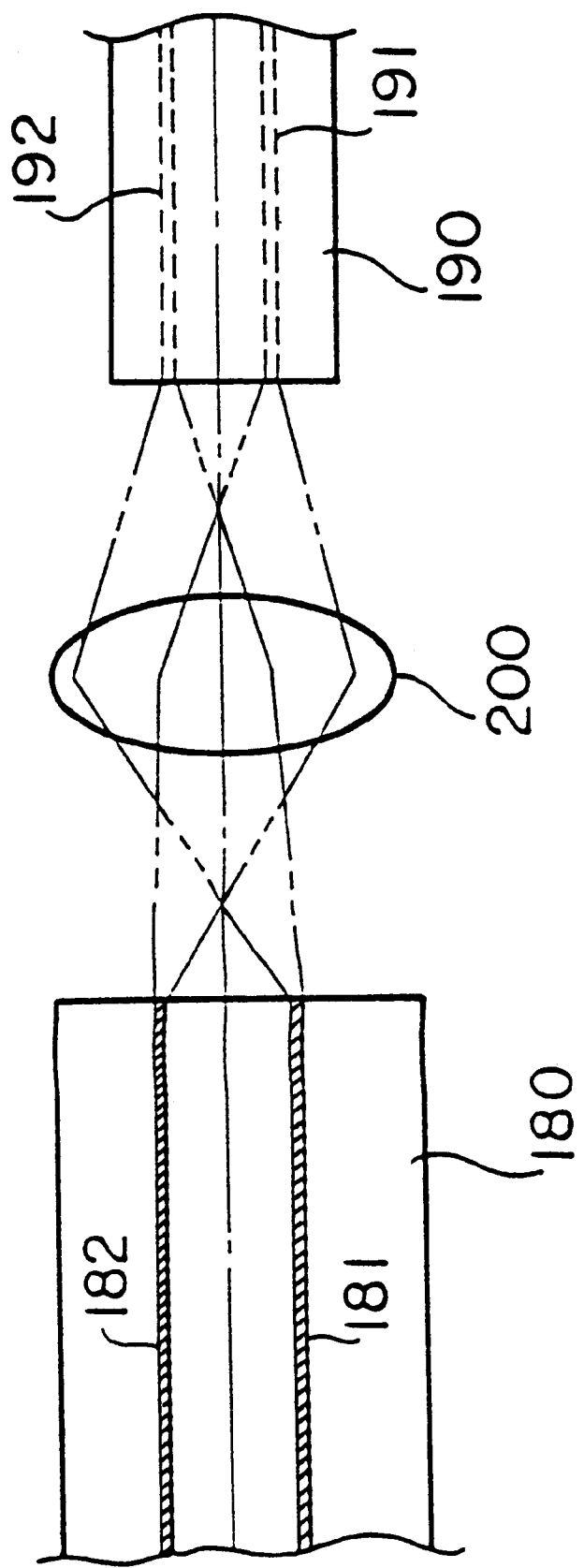
FIG. 16 is a top view showing the substrate, the 2-core ferrule and an aspherical lens appearing in FIG. 14.
Figure 17:
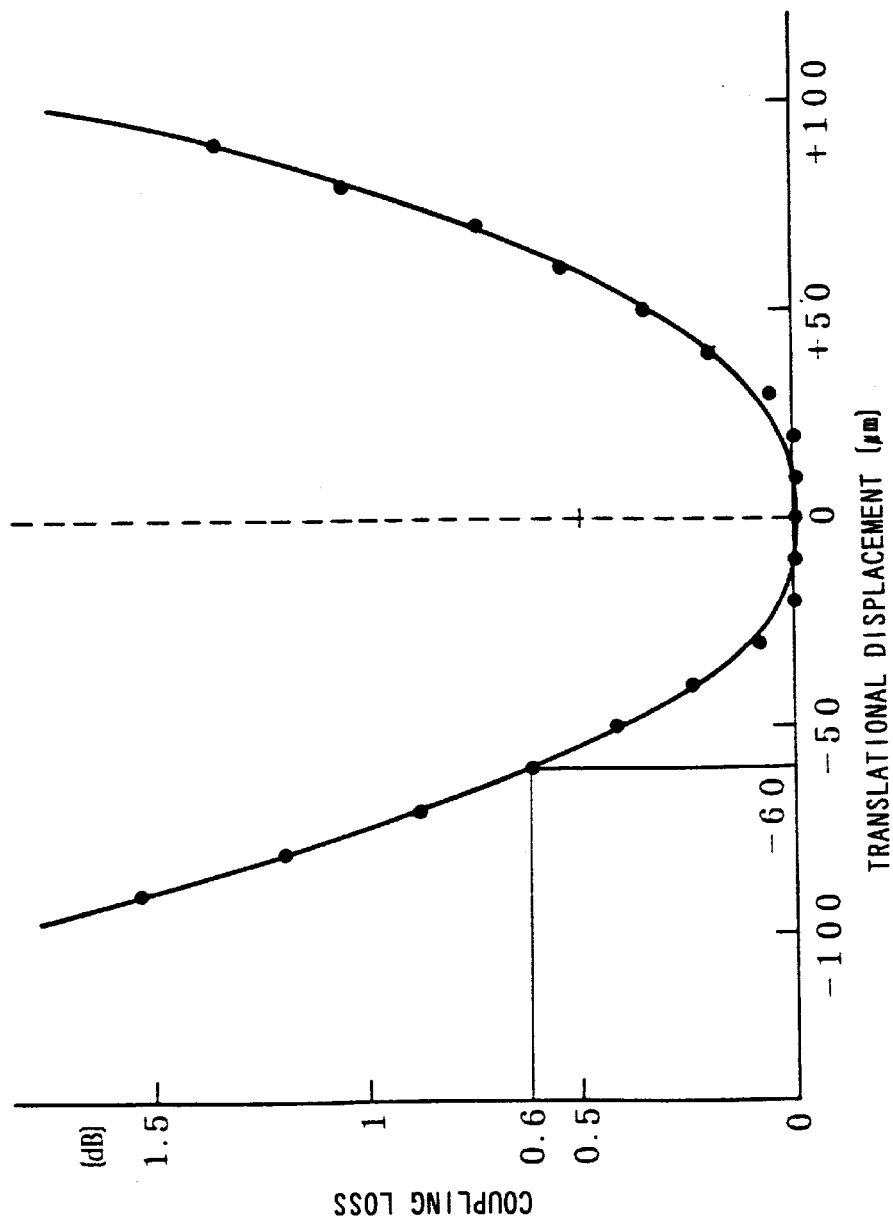
FIG. 17 is a graph showing the relationship between translational displacement and coupling loss.

FIGS. 9(A), 9(B) and 10 show the construction of a capillary 40 of a ferrule of a multiaxial optical coupler according to the third embodiment. FIG. 9(A) shows the appearance of the capillary before machining of linear through holes, while FIG. 9(B) shows an end view of the capillary. FIG. 10 shows the appearance of the capillary after machining of the linear through holes.

In the third embodiment, the cylindrical capillary 40 has end faces 41, 42, 43 formed by cutting away two portions of one end or bottom thereof. The end face 41 is a plane perpendicular to the central axis of the cylinder. The end faces 42, 43 are inclined at respective predetermined minus and plus angles (e.g. respective minus and plus approximately 1.5 degrees) with respect to the end face 41. Three linear through holes 41a, 42a, 43a are formed through the capillary 40 in a direction perpendicular to the three end faces 41, 42, 43, respectively. Locations of open ends of the linear holes 41a, 42a, 43a on the end faces 41, 42, 43 are set such that the distances between the respective central axes of the holes 41a, 42a, 43a are each held e.g. at 125 µm on the end face of the other side of the cylinder opposite to the end faces 41, 42, 43.

When a ferrule containing the capillary 40 is placed 3 mm away from a lens 30, the extension line of the optical axis of an optical beam emitted from each of optical fibers within the respective linear holes 41a, 42a, 43a passes through the center 31 of the lens 30.

A substrate (not shown in FIG. 10) with which optical coupling of the coupler is achieved via the lens 30 is formed with three optical waveguides corresponding respectively to the linear through holes in the capillary 40. The substrate is provided with an arrayed waveguide grating (AWG) filter for carrying out separation of optical multi-signals delivered from the capillary 40 through the lens 30 and the three optical waveguides.

The end faces 42, 43 of the capillary 40 can be easily formed by chamfering, which contributes to reduction of manufacturing costs. Further, the end faces can be chamfered with accuracy, facilitating adjustment of each optical axis.

In the above embodiments, the distance between the ferrule and the lens and that between adjacent ones of the central axes of the respective optical fibers on the lens-side end face of the ferrule are set to 3 mm and 125 µm, respectively, and the inclination angle of each of the linear through holes is set to approximately 1.3 degrees in the first and second embodiments and approximately 1.5 degrees in the third embodiment. However, this is not limitative, but the inclination angle should be set depending on the focal length of the lens. That is, the inclination angle is set smaller as the focal length of the lens is longer, and the former is set larger as the latter is shorter.

As described above, according to the present invention, a plurality of linear through holes are formed through a capillary in a manner each inclined with respect to the central axis of the capillary such that the central axis of each linear through hole extends through the center of a lens, and then an optical fiber is inserted into each of the through holes. Thus, an optical beam emitted from each optical fiber within the capillary passes through the center of the lens and reaches the end face of a corresponding optical waveguide formed in a substrate. Although the emitted optical beam is slightly inclined with respect to the optical axis of the lens, this inclination causes little increase in optical coupling loss.

Therefore, application of a thus constructed optical coupler to multiaxial optical coupling of a device using a substrate of LiNbO3 enables optical coupling reliable over a wide temperature range and with little coupling loss.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A multiaxial optical coupler for achieving optical coupling between end faces of a plurality of optical waveguides and the same number of optical fibers via a lens, said multiaxial optical coupler comprising:

a capillary provided within an end portion of a ferrule;

a plurality of linear through holes each extending through said capillary in a manner such that an extension line of a central axis thereof passes through a center of said lens; and a plurality of optical fibers inserted into said linear through holes, respectively.

2. A multiaxial optical coupler according to claim 1, wherein said capillary has a plurality of end faces formed on one longitudinal end thereof, said end faces being each in the form of a plane perpendicular to a central axis of a corresponding one of said linear through holes.

3. A multiaxial optical coupler according to claim 1, wherein said capillary has a plurality of planes formed on one longitudinal end thereof and spreading in different directions, respectively, and wherein each of said linear through holes extends in a direction perpendicular to a corresponding one of said planes.

4. A multiaxial optical coupler according to claim 1, further including a substrate formed with a plurality of optical waveguides and a plurality of oblique waveguide portions each formed as a lens-side end portion of a corresponding one of said optical waveguides in a manner such that an extension line of an axis of each of said oblique waveguide portions passes through said center of said lens.

5. A multiaxial optical coupler according to claim 4, wherein said each of said oblique waveguide portions has an end face thereof appearing on a lens-side end surface of said substrate, said end face having a shape obtained by dividing an oval figure in two along a longitudinal axis of said figure.

6. A multiaxial optical coupler according to claim 4, wherein each of said oblique waveguide portions is formed by diffusing a to-be-diffused material having a thickness non-uniform in a transverse direction.

* * * * *